(12) United States Patent
Nguyen

(10) Patent No.: US 6,745,640 B2
(45) Date of Patent: Jun. 8, 2004

(54) METHOD FOR MANUFACTURING A WORM SHAFT FOR A GEARBOX AND GEARBOX INCORPORATING SAME

(75) Inventor: Chuong H. Nguyen, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 11 days.

(21) Appl. No.: 10/146,379

(22) Filed: May 15, 2002

(65) Prior Publication Data

US 2003/0213325 A1 Nov. 20, 2003

(51) Int. Cl.[7] ................................................. F16H 1/16
(52) U.S. Cl. ....................................... 74/425; 74/606 R
(58) Field of Search ........................... 74/425, 457, 458, 74/462, 606 R

(56) References Cited

U.S. PATENT DOCUMENTS 4,020,715 A * 5/1977 Sollars ..................... 74/606 R
5,186,068 A * 2/1993 Heller ......................... 74/425

OTHER PUBLICATIONS

Mark's Standard Handbook for Mechanical Engineers; pp. 8–99 to 8–100; 10th Edition; 1996.*

* cited by examiner

*Primary Examiner*—David Fenstermacher
(74) *Attorney, Agent, or Firm*—Patrick S. Yoder; Alexander M. Gerasimow

(57) ABSTRACT

A method for manufacturing worm shafts for a gearbox. The method comprises using a common worm shaft blank to produce worm gears for all of the gear ratios of a family of gearboxes. The common worm shaft blank has a defined outer diameter. The method may comprise establishing an axial pitch to enable the worm shaft to be adapted with a thread to produce a desired gearbox ratio using the common worm shaft blank. The method may comprise adapting the common worm shaft blank to produce the worm shaft thread for the desired gear ratio. The system comprises a family of gearboxes having a plurality of gear ratios. The worm shafts for each of the gearboxes is adapted from a worm shaft produced from a common worm shaft blank. The worm shafts may all have the same outer diameter at the thread.

21 Claims, 9 Drawing Sheets

| EXAMPLE OF AXIAL PITCH CALCULATION FOR SPECIFIC DESIGN | RATIO 5:1 | RATIO 7.5:1 | RATIO 11:1 | RATIO 16:1 | RATIO 20:1 | RATIO 23:1 | RATIO 30:1 | RATIO 40:1 | RATIO 50:1 | RATIO 60:1 |
|---|---|---|---|---|---|---|---|---|---|---|
| OPERATING CENTER DISTANCE | 3.000 | 3.000 | 3.000 | 3.000 | 3.000 | 3.000 | 3.000 | 3.000 | 3.000 | 3.000 |
| WORM OD | 1.6500 | 1.6500 | 1.6500 | 1.6500 | 1.6500 | 1.6500 | 1.6500 | 1.6500 | 1.6500 | 1.6500 |
| ADDENDUM FACTOR | 1.00 | 1.00 | 1.00 | 1.00 | 1.00 | 1.00 | 1.00 | 1.00 | 1.00 | 1.00 |
| DESIGN X FACTOR | 0.15 | 0.15 | 0.00 | 0.15 | 0.15 | 0.00 | 0.15 | 0.15 | 0.00 | 0.00 |
| NO. OF THREAD | 8 | 6 | 4 | 4 | 2 | 2 | 1 | 1 | 1 | 1 |
| NO. OF TEETH | 40 | 45 | 44 | 60 | 40 | 46 | 30 | 40 | 50 | 60 |
| REDUCTION RATIO | 5.00 | 7.50 | 11.00 | 15.00 | 20.00 | 23.00 | 30.00 | 40.00 | 50.00 | 60.00 |
| CALCULATED AXIAL PITCH, PX | 0.3668 | 0.3156 | 0.3254 | 0.2344 | 0.3568 | 0.3108 | 0.4829 | 0.3668 | 0.2847 | 0.2366 |

FIG. 6 ately according to the
desired reduction ratio and the size of the frame of the speed
METHOD FOR MANUFACTURING A WORM SHAFT FOR A GEARBOX AND GEARBOX INCORPORATING SAME

BACKGROUND OF THE INVENTION

1. Field of the Invention

The present invention relates generally to the field of speed reducers, such as single and multiple-stage gear reduction machines. More particularly, the invention relates to a technique for manufacturing a plurality of worm shafts having different thread patterns corresponding to different gear ratios using a single blank model.

2. Description of the Related Art

Gearboxes are commonly employed to convert the rotational speed of a rotatable output shaft of a device to a lower, or higher, rotational speed that is more desirable for a given application. Gearboxes receive a shaft driven at a first rotational speed and use gears within the gearbox to drive an output shaft at a second speed. The ratio of the input speed to the output speed is known as the gear ratio. When the second speed is slower than the first speed, the gearbox is known as a speed reducer and the gear ratio is commonly referred to as the reduction ratio. Speed reducers are commonly employed when the prime mover, such as an electric motor, operates more efficiently at a high speed, while a lower speed is more desirable for the application. Speed reducers in industrial applications may include single or multiple stages depending upon the speed and torque requirements and the overall gearbox ratio. Moreover, in most applications the gear ratio of the speed reducer is fixed, with changes in input-to-output ratios being varied by varying the input speed, by the use of a transmissions, a variable-speed sheave drive, and so forth.

Worm gears are an example of the types of gears that have been used in gearboxes, including speed reducers. A worm gear typically consists of a spirally, or helically, threaded shaft, referred to as the worm shaft, and a toothed wheel, referred to as the gear. The worm shaft is used to drive the gear. In single-stage speed reducers, the worm shaft is typically coupled to an input shaft, which may be coupled to a drive shaft of a prime mover. The gear is coupled to an output shaft, which, in turn, may be coupled to a load. The worm shaft meshes with the gear and causes the gear to rotate as the worm shaft is rotated. The worm shaft rotates about a first axis and the gear rotates about a second axis. The displacement between the centers of these two axes is known as the center spacing. The gear ratio is defined by the parameters of the worm shaft and the gear in accordance with well-established formulae. In multiple-stage gear reduction sets, multiple worm gears are used to successively reduce the speeds of rotation to obtain a desired output speed for the load. The overall gear reduction ratio is a product of the reduction ratios of the successive stages.

A speed reducer typically is positioned between a drive shaft of a motor and an input shaft of a load. The worm shaft typically is driven by the drive shaft of the motor and the input shaft of the load is driven by the output shaft of the gearbox. Thus, alignment of the drive shaft with the worm shaft and the load with the output shaft is important for proper operation. Therefore, worm gear gearboxes typically are characterized by their center spacing, or frame size. The frame size of a speed reducer corresponds to the center spacing between the center of the axis of the worm shaft and the center of the axis of the gear. For a given frame size, speed reducer manufacturers typically produce a family of speed reducers, each having a different reduction ratio.

Different worm shafts and gears are used to produce the different reduction ratios. Generally, the worm shafts are designed and manufactured separately according to the desired reduction ratio and the size of the frame of the speed reducer. Typically, each worm shaft is machined from a blank worm shaft. However, because the worm gears are designed and manufactured separately according to the desired reduction ratio and the size of the frame of the speed reducer, different blanks are used to manufacture different worm shafts having different thread patterns, even when they are to be used in the same frame. This increases the number of different parts that a worm gearbox must maintain in inventory.

There is a need, therefore, for an improved technique for manufacturing worm shafts which would reduce the overall number of different parts that are used to manufacture a family of speed reducers.

SUMMARY OF THE INVENTION

The present technique provides a novel approach to manufacturing worm shafts and gearboxes to respond to these needs. In accordance with the first aspect of the technique, a method is provided for manufacturing a worm shaft for use in a family of gearboxes. The method may comprise establishing a desired axial pitch for a thread of the worm shaft to produce a desired gearbox ratio. The desired axial pitch may be based on the outer diameter of a worm shaft blank used for all gearbox ratios of the family of gearboxes. The method also may comprise adapting the worm shaft blank with a thread having the desired axial pitch.

In accordance with another aspect of the present invention, a family of gearboxes is featured. Each gearbox in the family of gearboxes comprises a worm shaft, a gear, and a frame. The worm shaft and gear are adapted for engagement to produce rotation in the gear. The frame is adapted to support the worm shaft and gear. The worm shaft and gear are supported by the housing to a specific center spacing between the worm shaft and the gear. The family of gearboxes is defined by the center spacing of the worm shaft and the gear and includes speed reducers of a plurality of different gearbox ratios. Each worm shaft in the family of gearboxes has substantially the same outer diameter of the thread.

BRIEF DESCRIPTION OF THE DRAWINGS

The foregoing and other advantages and features of the invention will become apparent upon reading the following detailed description and upon reference to the drawings in which:

FIG. 6 is a table of the characteristics of worm gears for a family of speed reducers, according to an exemplary embodiment of the present technique.

DETAILED DESCRIPTION OF SPECIFIC EMBODIMENTS

Figure 1:
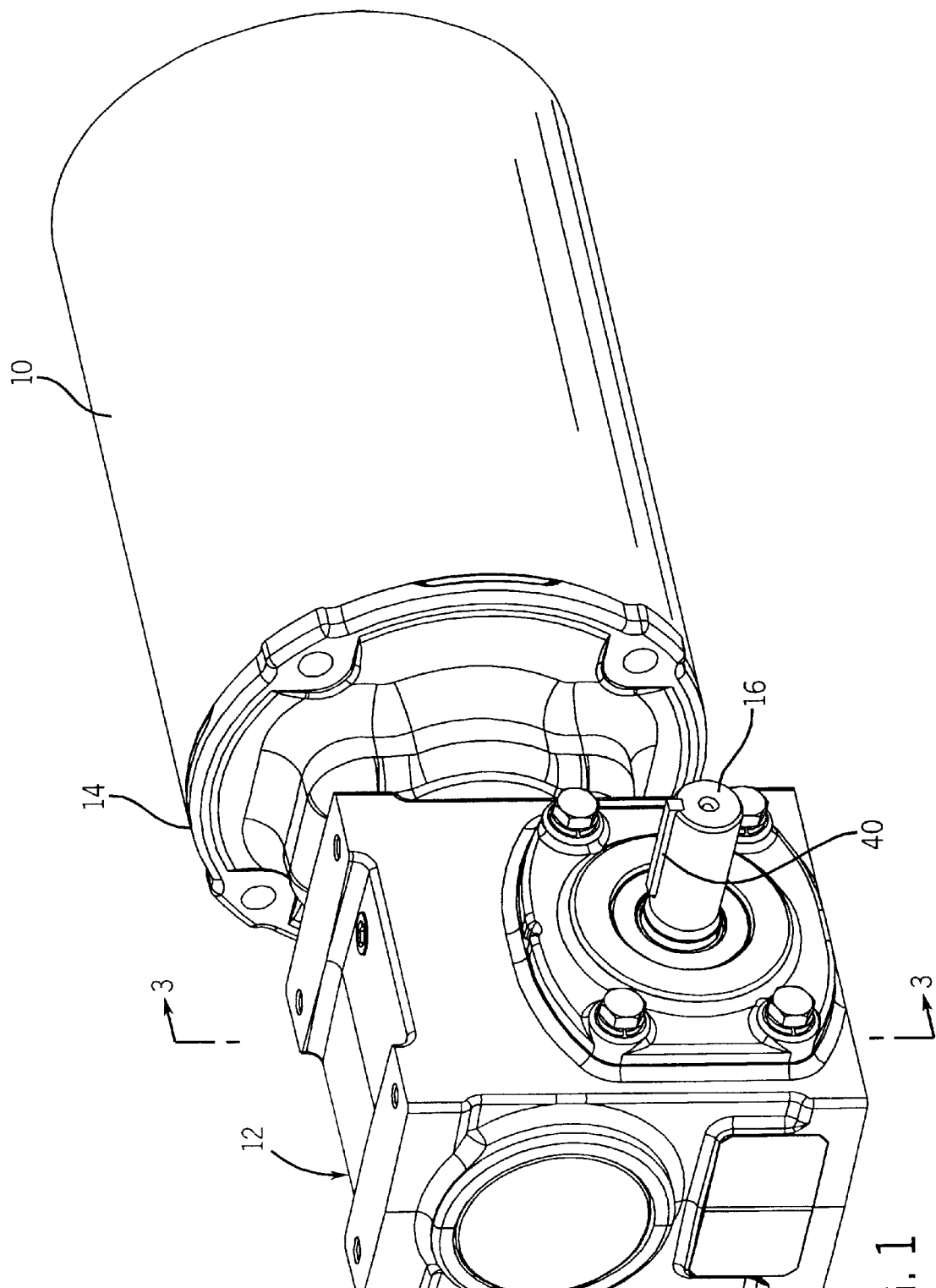
FIG. 1 is a perspective view of an electric motor and speed reducer, according to an exemplary embodiment of the present technique.

Referring generally to. FIG. 1, an electric motor 10 and a gearbox 12 are illustrated. In this embodiment, the gearbox is a speed reducer. The speed reducer 12 has an adapter 14 to enable the speed reducer 12 to be secured to the electric motor 10. The speed reducer 12 has an output shaft 16 that is driven by the electric motor 10. In the illustrated embodiment, as the drive shaft (not shown) of the electric motor 10 is rotated at a first speed, the output shaft 16 is driven at a second, lower speed. However, the gearbox 12 may also be adapted to increase the speed of the output shaft 16, in relation to the drive shaft of the electric motor 10. The output shaft 16 may, in turn, be coupled to a load to drive the load in rotation. In addition, the illustrated speed reducer 12 may also be adapted for coupling to the drive shaft of an engine, such as a diesel engine.

Figure 2:
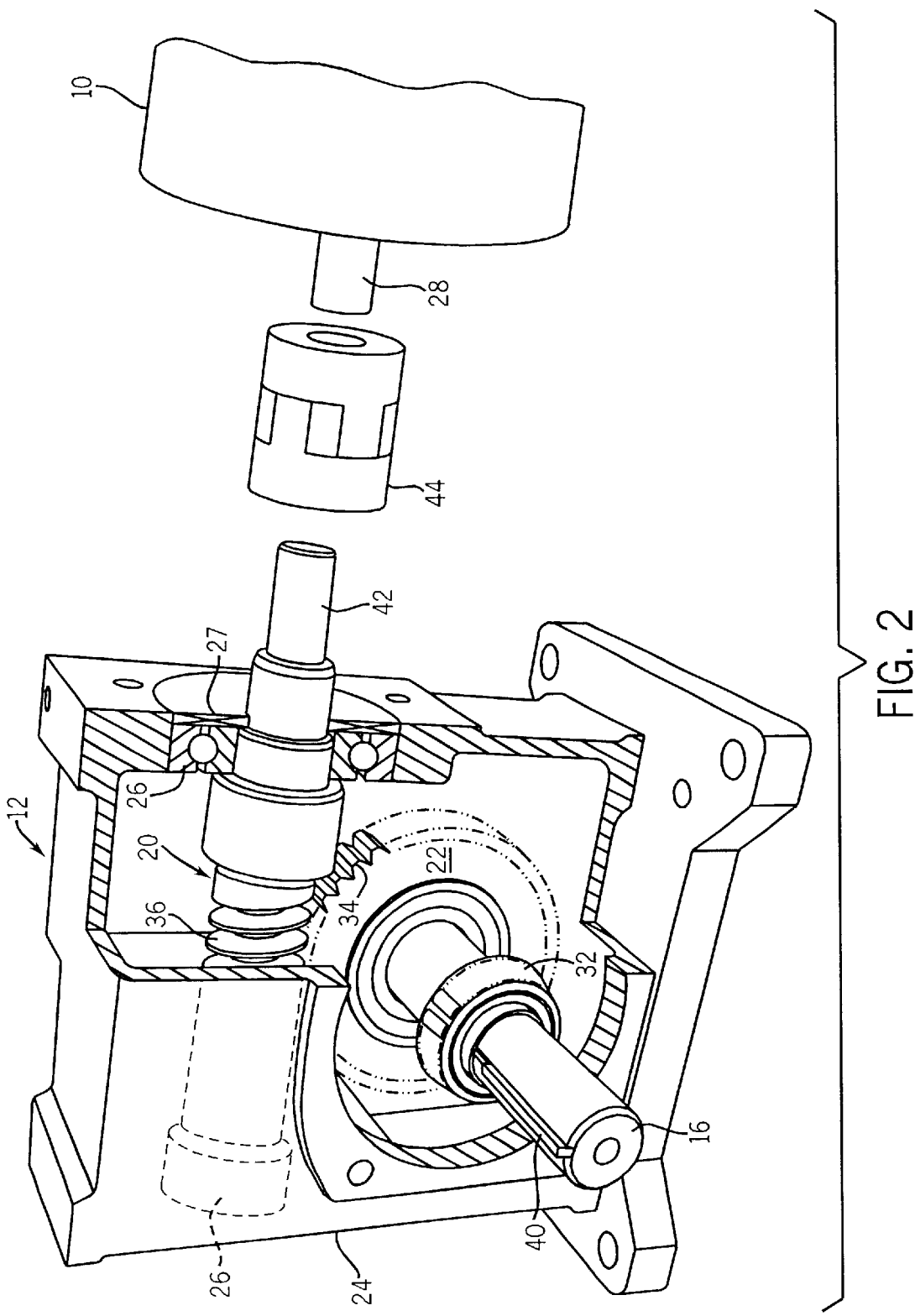
FIG. 2 is a partially cut-away view of the speed reducer of FIG. 1.
Figure 2A:
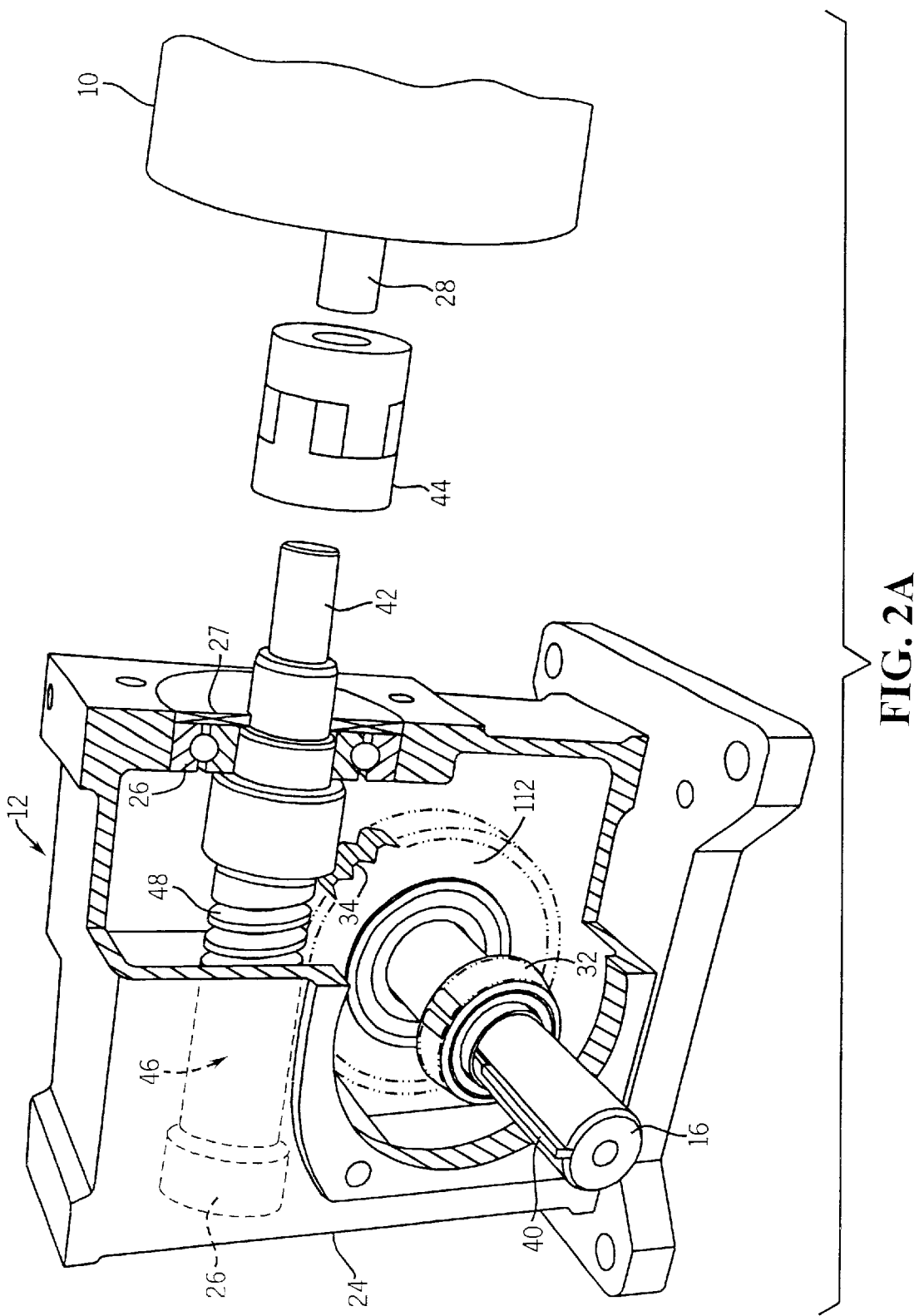
FIG. 2A is a partially cut-away view of an alternate embodiment of the speed reducer of FIG. 1.
Figure 2B:
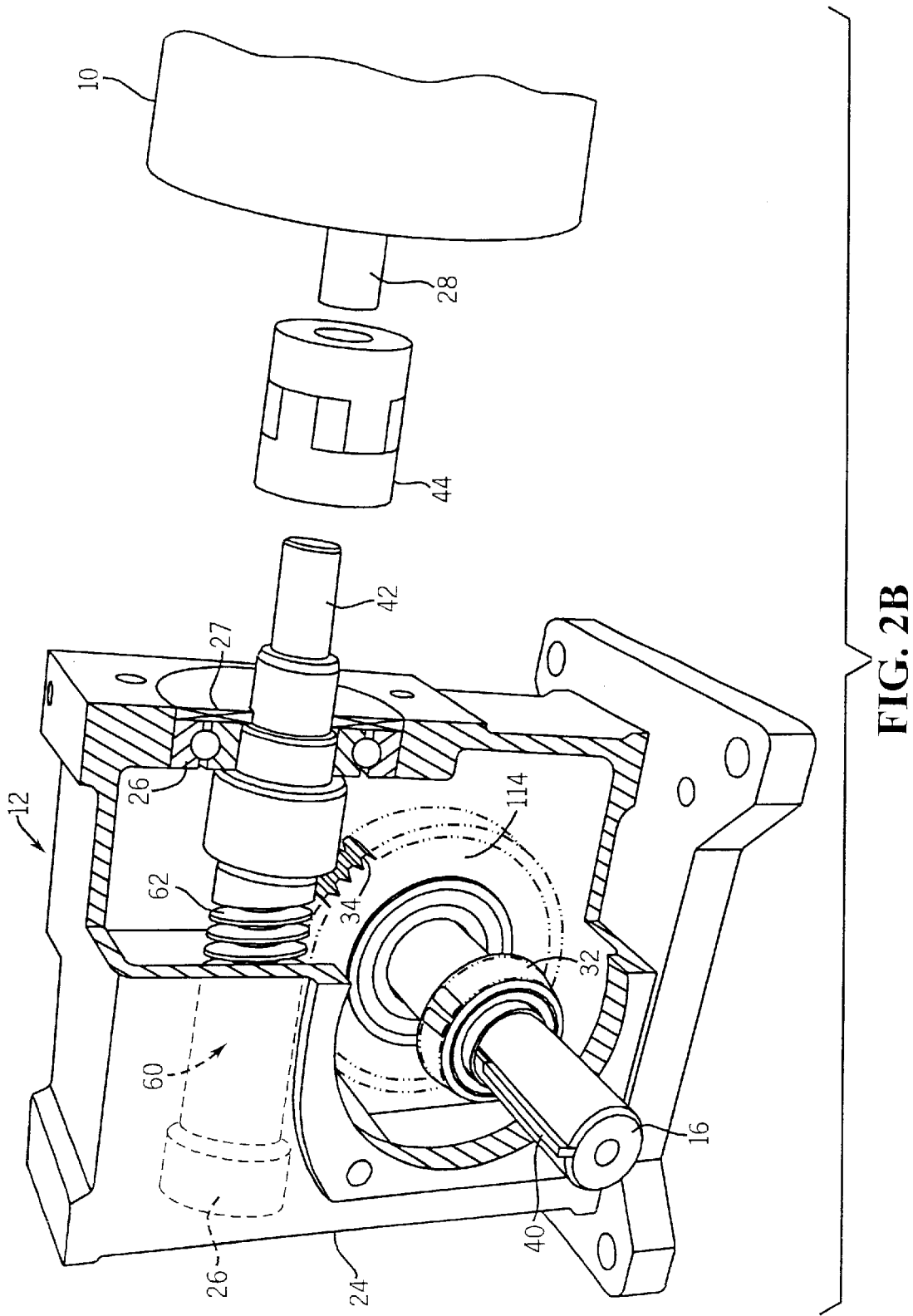
FIG. 2B is a partially cut-away view of another alternate embodiment of the speed reducer of FIG. 1.

Referring generally to FIG. 2, the speed reducer 12 has a worm shaft 20 and a gear 22 housed within a frame 24. The worm shaft 20 is drivingly coupled to the electric motor 10 for rotation. As the worm shaft 20 is rotated, the worm shaft 20 drives the gear 22 into rotation. The gear 22 is, in turn, coupled to the output shaft 16. As the gear 22 is rotated, the output shaft 16 is rotated. By changing certain characteristics of the worm shaft 20 and gear 22, such as the number of teeth on the gear 22, the speed of rotation of the output shaft 16 may be reduced from the speed of rotation of the motor 10 by a specific ratio, such as 5 to 1, 10 to 1, etc. As discussed above, the characteristics of the worm shaft 20 and gear 22 may also be varied so as to increase the speed of the output shaft 16 in relation to the output of the electric motor.

In the illustrated embodiment, the worm shaft 20 is supported for rotation within the frame 24 by a bearing 26. A seal 27 is used to prevent contaminants from entering the speed reducer 12. In the illustrated embodiment, a drive shaft 28 of the electric motor 10 is used to drive the worm shaft 20. In this embodiment, an extension 30 is used to couple the worm shaft 20 to the drive shaft 28.

Figure 3:
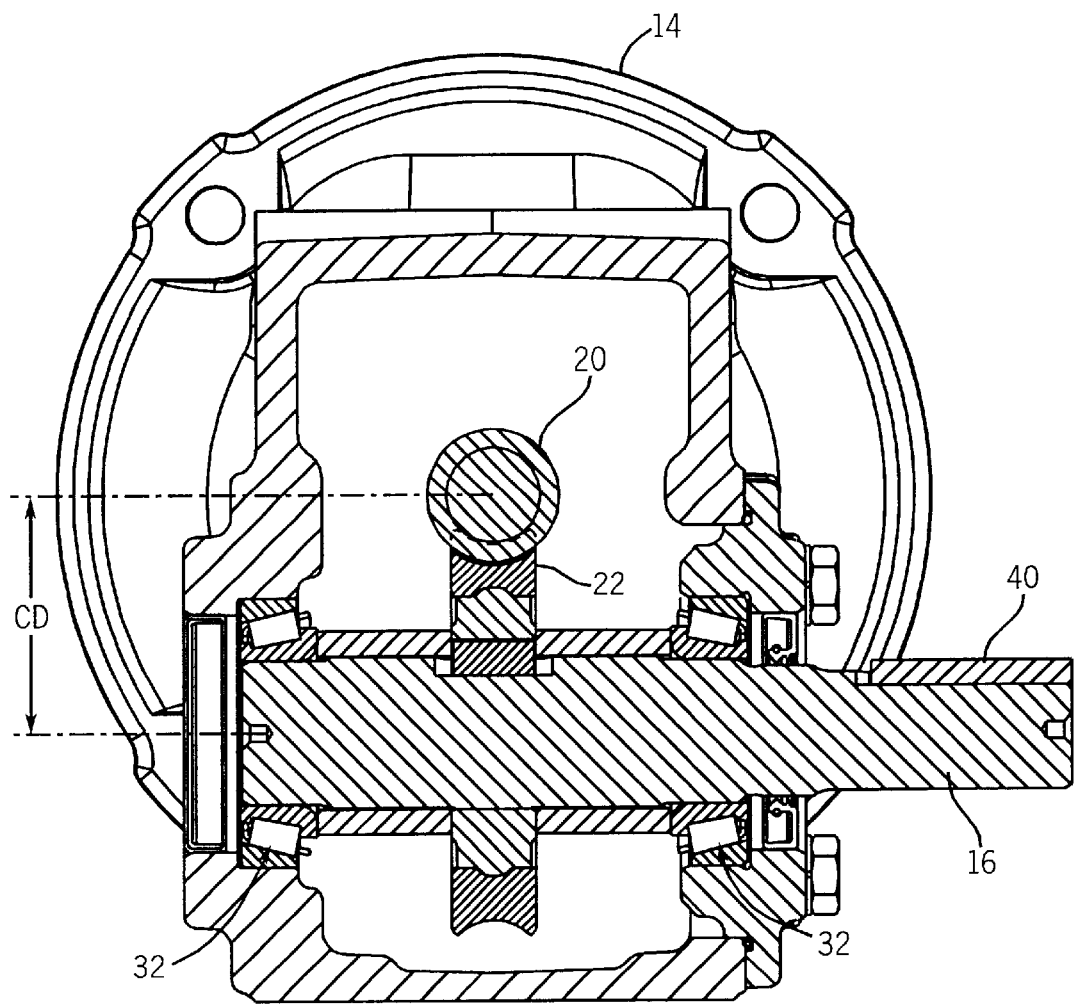
FIG. 3 is a cross-sectional view of the speed reducer of FIG. 1, taken generally along line 3—3 of FIG. 1.

Referring generally to FIGS. 2 and 3, the gear 22 is coupled to the output shaft 16. The output shaft 16 is supported for rotation within the frame 24. In the illustrated embodiment, the output shaft 16 is supported by roller bearings 32 at each end. The gear 22 has teeth 34. The worm shaft 20 has a helical thread 36. The teeth 34 of the gear 22 interact with the helical thread 36 of the worm shaft 20. As the worm shaft 20 is rotated, the thread 36 engages the teeth 34 of the gear 22, causing the gear 22 and the output shaft 16 to rotate. The speed of rotation of the gear 22 may be changed by varying the number of teeth 34 around the circumference of the gear 22. In the illustrated embodiment, the output shaft 16 has a key 40 for drivingly coupling the output shaft 16 to a load. In addition, in the illustrated embodiment, a shaft portion 42 of the extension 30 and a coupler 44 are used to couple the drive shaft 28 to the extension 30. However, in another embodiment, the extension may have an opening for receiving the drive shaft 28 directly into the extension 30.

Referring generally to FIG. 3, the worm shaft 20 and gear 22 are configured for support within a frame 24 having a specific frame size. The frame size is defined by the center distance "CD" between the axis of the worm shaft 20 and the axis of the output shaft 16. If the worm shaft 20 and gear 22 are not configured properly for the frame size, the worm shaft 20 and gear 22 may not come into contact with each other or they may interfere with each other. This view also illustrates the interaction of the worm shaft 20 and the gear 22. In this embodiment, the teeth 34 of the gear 22 have a concave shape for more efficient interaction with the thread 36 of the worm shaft 20.

Referring generally to FIGS. 4A through 4F, worm shafts for a family of speed reducers are illustrated. For a given frame size, a manufacturer of speed reducers typically provides a family of speed reducers having various reduction ratios, i.e., 2 to 1, 5 to 1, 10 to 1, etc. As discussed above, the various reduction ratios are provided by varying certain characteristics of the thread 36 of the worm shaft 20 and the teeth 34 of the gear 22. In addition, the worm shafts of FIGS. 4A through 4F are manufactured from the same worm shaft blank.

Figure 4A:
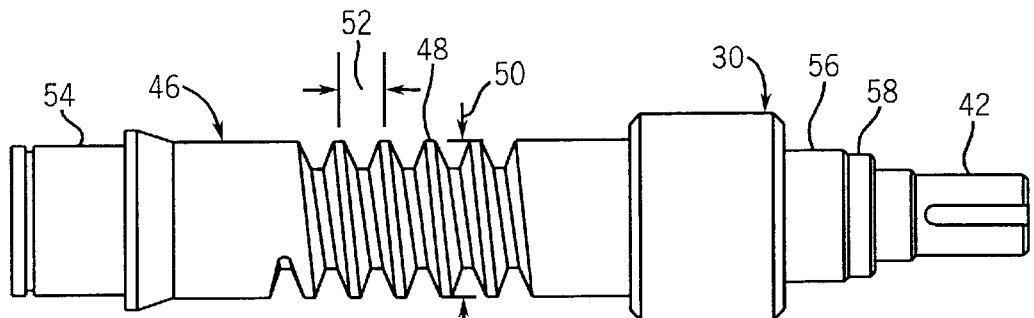
FIGS. 4A–4F are elevational views of a plurality of worm shafts for a family of speed reducers, according to an exemplary embodiment of the present technique.

Referring generally to FIG. 4A, an embodiment of one worm shaft 46 of a family of worm shafts for a family of speed reducers having a defined center distance CD is illustrated. The worm shaft 46 will interact with a corresponding gear to produce a first reduction ratio for the speed reducer. The worm shaft 46 is adapted with a first thread pattern 48 designed to cooperate with the gear to produce the first reduction ratio. The thread 48 has an outer diameter 50 and a first axial pitch 52. The worm shaft 46 has a bearing surface 54 at one end and an extension 30 at the other end. The extension has a bearing surface 56 and a sealing surface 58.

Figure 4B:
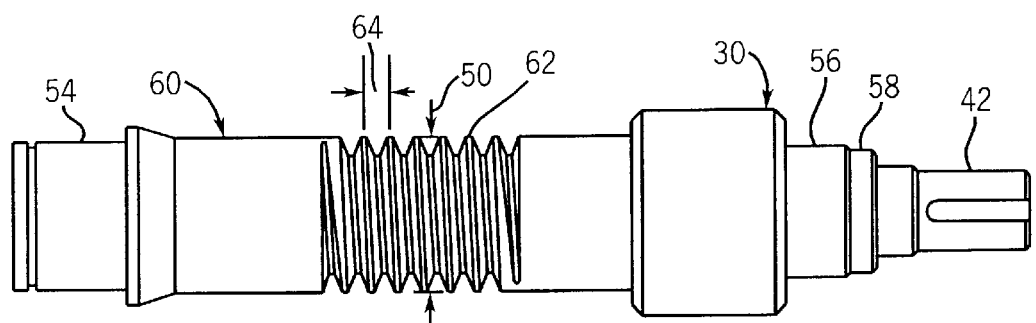

Referring generally to FIG. 4B, an embodiment of a second worm shaft 60 of the family of worm shafts for a family of speed reducers having a defined center distance CD is illustrated. The worm shaft 60 will interact with a corresponding gear to produce a second reduction ratio for the speed reducer. The worm shaft 60 is adapted with a second thread pattern 62 designed to cooperate with the gear to produce the second reduction ratio. The thread 62 has the same approximate outer diameter 50 as the first worm shaft 46 and a second axial pitch 64.

Figure 4C:
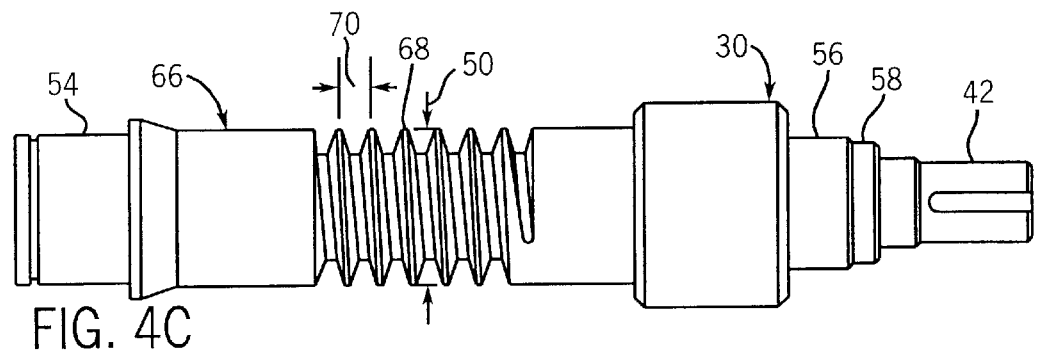

Referring generally to FIG. 4C, an embodiment of a third worm shaft 66 of the family of worm shafts for a family of speed reducers having a defined center distance CD is illustrated. The worm shaft 66 will interact with a corresponding gear to produce a third reduction ratio for the speed reducer. The worm shaft 66 is adapted with a third thread pattern 68 designed to cooperate with the gear to produce the third reduction ratio. The thread 62 has the same approximate outer diameter 50 as the previous worm shafts, but a third axial pitch 70.

Figure 4D:
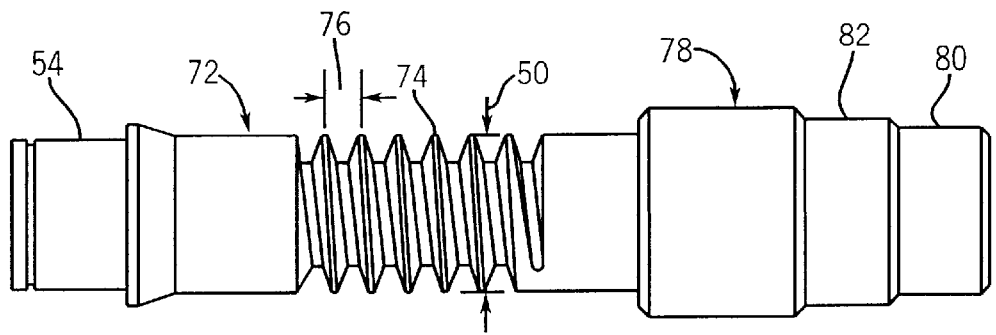

Referring generally to FIG. 4D, an embodiment of a fourth worm shaft 72 of a family of worm shafts for a family of speed reducers having a defined center distance CD is illustrated. The worm shaft 72 will interact with a corresponding gear to produce a fourth reduction ratio for the speed reducer. The worm shaft 72 is adapted with a first thread pattern 74 designed to cooperate with the gear to produce the fourth reduction ratio. The thread 74 has an outer diameter 50 and a fourth axial pitch 76. The illustrated worm shaft 72 has an alternative embodiment of an extension 78 at the other end. The alternative extension 78 is adapted for support by the drive shaft 28 of the electric motor 10, rather than by a bearing. The extension 78 has a receiving portion 80 for receiving the drive shaft 28 and a sealing surface 82 for forming a seal with the frame 24 or adapter 14.

Figure 4E:
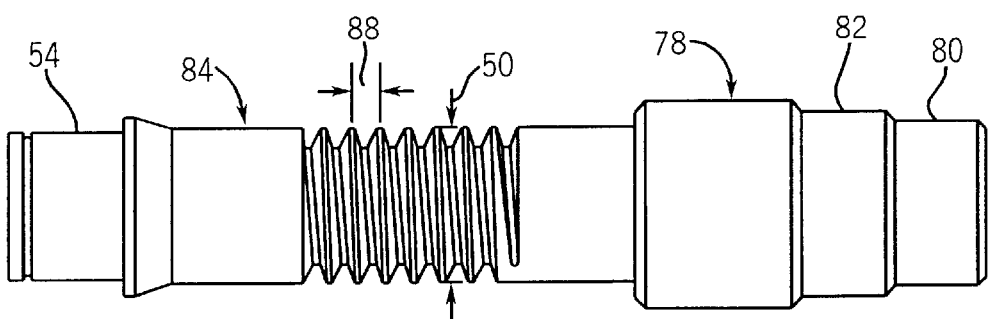

Referring generally to FIG. 4E, an embodiment of a fifth worm shaft 84 of the family of worm, shafts for a family of speed reducers having a defined center distance CD is illustrated. The worm shaft 84 will interact with a corresponding gear to produce a fifth reduction ratio for the speed reducer. The worm shaft 84 is adapted with a fifth thread pattern 86 designed to cooperate with the gear to produce the fifth reduction ratio. The thread 86 has the same approximate outer diameter 50 as the previous worm shafts, but a fifth axial pitch 86.

Figure 4F:
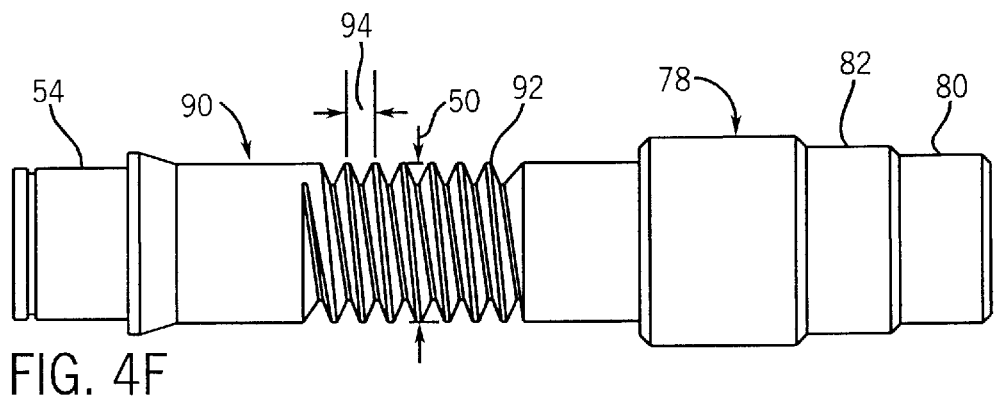

Referring generally to FIG. 4F, an embodiment of a sixth worm shaft 90 of the family of worm shafts for a family of speed reducers having a defined center distance CD is illustrated. The worm shaft 90 will interact with a corresponding gear to produce a sixth reduction ratio for the speed reducer. The worm shaft 90 is adapted with a sixth thread pattern 92 designed to cooperate with the gear to produce the sixth reduction ratio. The thread 92 has the same approximate outer diameter 50 as the previous worm shafts, but a sixth axial pitch 94.

Figure 5:
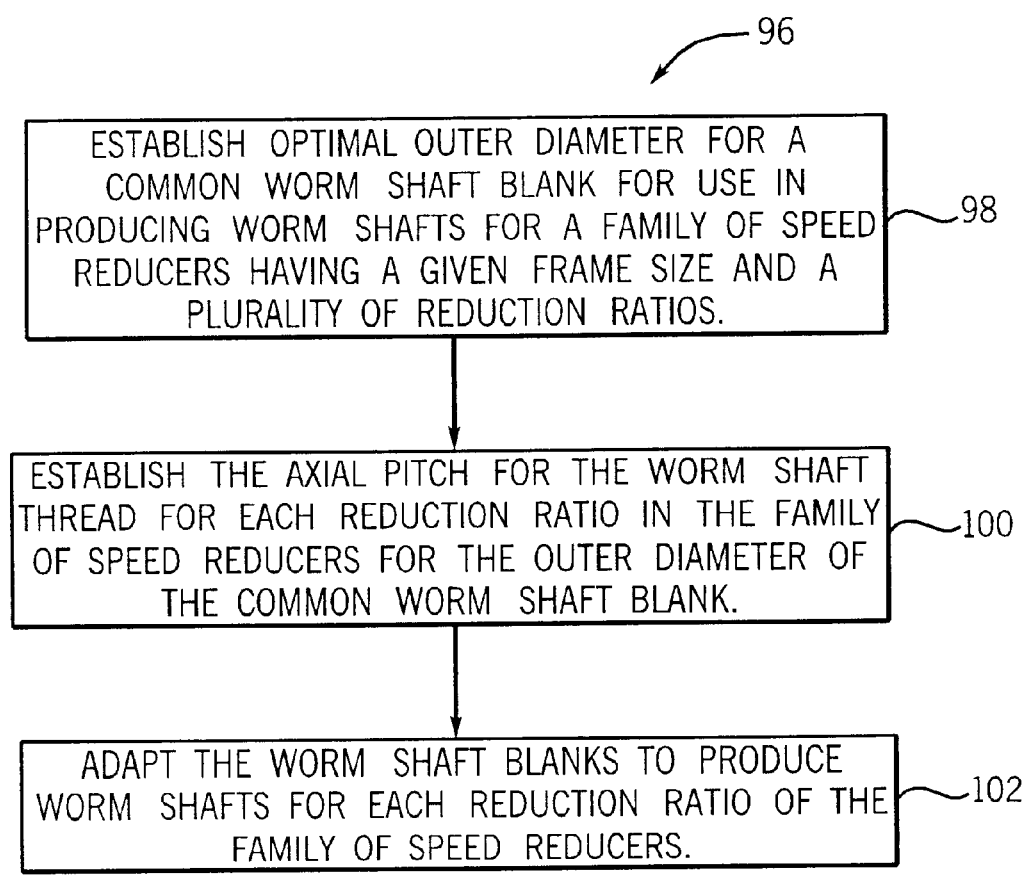
FIG. 5 is a block diagram of a process of manufacturing a worm shaft, according to an exemplary embodiment of the present technique.

Referring generally to FIG. 5, a process, designated generally by reference numeral 96, for manufacturing worm shafts for a family of speed reducers from a common worm shaft blank is illustrated. The process may comprise establishing an optimal outer diameter for the common worm shaft blank, as represented by block 98. Several factors may be used in establishing the optimal outer diameter of the worm shaft blank. Examples of these factors may include the range of reduction ratios to be included in the family, the center distance, and the torques involved.

The process comprises establishing the axial pitch "PX" for the worm shaft thread for each reduction ratio in the family of speed reducers for the outer diameter of the common worm shaft blank, as represented by block 100. For a specific size unit that usually is defined by the center distance of the gear set, the worm thread of any worm gear ratio can be made from a single worm shaft blank by selecting the thread size, i.e., axial pitch "PX", that generates the same worm shaft outer diameter "OD" as the blank. A number of worm gear criteria are used to establish the axial pitch of the thread for a given reduction ratio and for the specific frame size.

| | |
|---|---|
| The Addendum Factor = | ADD |
| The Worm Gear Profile Shift Coefficient = | Xg |
| The Number of Worm Shaft Threads = | THR |
| The Number of Gear Teeth = | TH |
| The Reduction Ratio = | TH/THR |

The Addendum Factor and Worm Gear Profile Shift Coefficient are constants that are familiar to those skilled in the art.

The axial pitch, PX, for a specific worm shaft thread OD can be calculated as follows:

$$PX = \frac{(2*CD - OD)*\pi}{TH + 2*Xg - 2*ADD} \quad (1)$$

The following are examples to illustrate the axial pitch PX calculation.

| | |
|---|---|
| Operating Center Distance, CD = | 3.00 in. |
| Worm Shaft Outside Diameter, OD = | 1.65 in. |
| Addendum Factor, ADD = | 1 |
| Worm Gear Profile Shift Coefficient, Xg = | .15 |
| Number of Worm Thread = | 1 |
| Number of Gear Teeth = | 40 |
| Reduction Ratio = | 40 to 1 |

$$PX = \frac{(2*CD - OD)*\pi}{TH + 2*Xg - 2*ADD} \quad (1)$$

$$= \frac{(2*3 - 1.65)*3.1416}{40 + 2*.15 - 2*1}$$

$$= .35681 \text{ in.}$$

A second example illustrates the axial pitch PX determination for a second reduction ratio.

| | |
|---|---|
| Number of Worm Threads = | 2 |
| Number of Gear Teeth = | 45 |
| Reduction Ratio = | 22.5 to 1 |

$$PX = \frac{(2*CD - OD)*\text{Pi}}{TH + 2*Xg - 2*ADD} \quad (1)$$

$$= \frac{(2*3 - 1.65)*3.1416}{45 + 2*.15 - 2*1}$$

$$= .31561 \text{ in.}$$

The process also comprises adapting the worm shaft blanks to produce worm shafts for each reduction ratio of the family of speed reducers, as represented by block 102. The worm shaft blanks are adapted with a thread having the desired axial pitch PX for the desired reduction ratio. A number of methods and steps may be used to adapt the worm shaft blank with a thread having the desired axial pitch.

Referring generally to FIG. 6, a table, referenced generally by reference numeral 110, is provided to illustrate the characteristics of the worm shafts and gears for a family of speed reducers. The columns of the table illustrate different reduction ratios in the family of speed reducers. Each of the worm shafts and gears in the family of speed reducers are separated by the same center distance, regardless of the reduction ratio. In addition, the outer diameter of the worm shafts in the family of speed reducers is the same for each reduction ratio.

The above-described technique enables a single worm shaft blank to be used for a family of speed reducers, regardless of the reduction ratio. This reduces the number of worm shaft blanks that must be produced or obtained by a speed reducer manufacturer. In addition, because a common worm shaft blank is used for reduction ratios, a common bearing may be used on at least one end of the worm shaft for all speed reducers in the family of speed reducers. Thereby reducing the number of different bearings that must be produced or obtained by a speed reducer manufacturer.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, the above-described technique is applicable in devices that increase rotational speed, as well as in speed reducers.

What is claimed is:

1. A family of gearboxes, each gearbox in the family of gearboxes comprising:
    a worm shaft having at least one thread;
    a gear, the worm shaft and gear being adapted for the worm shaft to rotate the gear; and
    a frame adapted to support the worm shaft and gear at a specific center spacing between the worm shaft and the gear,
    wherein the family of gearboxes is defined by the center spacing between the worm shaft and gear, and the family of gearboxes comprises gearboxes of a plurality of gear ratios, each worm shaft in the family of gearboxes having substantially the same outer diameter of the at least one thread.

2. The family of gearboxes as recited in claim 1, wherein the worm shaft diameter of at least one end of the worm shaft has substantially the same outer diameter for all gear ratios of gearboxes in the family of gearboxes.

3. The family of gearboxes as recited in claim 2, wherein each gearbox in the family of gearboxes comprises a bearing for rotational support of the worm shaft at the at least one end of the worm shaft, wherein the bearing has the same interior diameter in each gearbox in the family of gearboxes.

4. The family of gearboxes as recited in claim 1, wherein each gearbox comprises a worm shaft extension adapted to support at least one end of the worm shaft.

5. A method of manufacturing a plurality of worm shafts for use in a family of gearboxes comprising:
    establishing a common center to center distance between the worm shaft and a wheel for the family of gearboxes;
    establishing a first desired axial pitch for a thread of the worm shaft for a first desired gear ratio based on the outer diameter of a worm shaft blank for use with all gear ratios of the family of gearboxes; and
    establishing a second desired axial pitch for a thread of the worm shaft for a second desired gear ratio based on the outer diameter of the worm shaft blank for use with all gear ratios of the family of gearboxes.

6. The method as recited in claim 5, comprising establishing an optimal outer diameter of the worm shaft blank for use with all gear ratios of the family of gearboxes.

7. The method as recited in claim 5, wherein the axial pitch is based on the center spacing between the worm shaft and gear within the gearbox.

8. The method as recited in claim 5, wherein the axial pitch is based on the outer diameter of the worm shaft blank.

9. The method as recited in claim 5, wherein the axial pitch is based on an addendum factor.

10. The method as recited in claim 5, wherein the axial pitch is based on a worm gear profile shift coefficient.

11. A plurality of gearboxes, comprising:
    a first gearbox comprising a first worm shaft and a first gear, the first worm shaft and first gear having a first speed gear ratio, the first worm shaft having a first thread having a first axial pitch; and
    a second gearbox comprising a second worm shaft and a second gear, the second worm shaft and second gear having a second speed gear ratio, the second worm shaft having a second thread having a second axial pitch,
    wherein the first and second threads have substantially the same outer diameter.

12. The plurality of gearboxes as recited in claim 11, wherein the first gearbox supports the first worm shaft and the first gear and the second gearbox supports the second worm shaft and the second gear, both the first worm shaft and the first gear and the second worm shaft and the second gear being supported at the same defined central spacing.

13. The plurality of gearboxes as recited in claim 11, wherein the first and second gearboxes each comprise a housing, the housing being adapted to support both the first worm shaft and the first gear and the second worm shaft and the second gear at the defined central spacing.

14. The plurality of gearboxes as recited in claim 11, wherein each gearbox comprises a worm shaft extension adapted to support a worm shaft of at least one end of the worm shaft.

15. A family of gearboxes, comprising:
    a plurality of worm gears, each worm gear having a different gear ratio, wherein the worm shaft for each of the worm gears has substantially the same outer diameter; and
    a common housing for use with each of the plurality of worm gears, the common housing being adapted to house a worm shaft and a gear at a defined center spacing between the worm shaft and the gear.

16. The family of gearboxes as recited in claim 15, wherein each worm shaft is drivingly coupleable to an external drive shaft.

17. The family of gearboxes as recited in claim 15, wherein each gear is coupled to an output shaft o each gearbox.

18. A method of manufacturing a worm gear, comprising:
    establishing a desired gear ratio for the worm gear; and
    adapting a common worm shaft blank with a thread corresponding to the desired gear ratio, the common worm shaft blank being operable to produce a worm shaft for all gear ratios in a family of worm gears.

19. The method as recited in claim 18, wherein adapting comprises adapting each worm shaft blank with a thread having a defined axial pitch for each gear ratio.

20. The method as recited in claim 18, comprising fitting an extension to at least one end of the worm shaft.

21. The method as recited in claim 18, comprising establishing an optimal outer diameter for the common worm shaft blank for use with all gear ratios of the family of worm gears.

* * * * *